United States Patent [19]

Amano et al.

[11] 4,192,265

[45] Mar. 11, 1980

[54] COMBUSTION PROMOTING DEVICE OF A MULTI-CYLINDER ENGINE

[75] Inventors: Masuo Amano, Okazaki; Toshio Tanahashi, Toyota, both of Japan

[73] Assignee: Toyota Jidosha Kogyo Kabushiki Kaisha, Toyota, Japan

[21] Appl. No.: 900,595

[22] Filed: Apr. 27, 1978

[30] Foreign Application Priority Data

Dec. 2, 1977 [JP] Japan .................. 52-144679

[51] Int. Cl.² .......................... F02B 33/00; F02B 3/00; F02D 39/02
[52] U.S. Cl. ............................ 123/119 A; 123/75 B; 123/75 E; 123/32 SP; 123/105
[58] Field of Search ............... 123/75 C, 75 B, 75 E, 123/105, 119 D, 119 A, 26, 124 R, 30 C, 32 SP, 32 ST, 191 S

[56] References Cited

U.S. PATENT DOCUMENTS

| | | | |
|---|---|---|---|
| 1,788,076 | 1/1931 | Zaikowsky | 123/75 E |
| 3,418,981 | 12/1968 | Von Seggern et al. | 123/75 B |
| 4,023,543 | 5/1977 | Ishikawa | 123/75 B |
| 4,069,796 | 1/1978 | Balsley | 123/75 B |
| 4,084,556 | 4/1978 | Villella | 123/105 |
| 4,116,189 | 9/1978 | Asaga | 123/190 BB |

Primary Examiner—Charles J. Myhre
Assistant Examiner—M. Moy
Attorney, Agent, or Firm—Kenyon & Kenyon

[57] ABSTRACT

Disclosed is a multi-cylinder engine having auxiliary valves, in addition to intake and exhaust valves. Each of the cylinders is connected to a common accumulation chamber via corresponding branches. Each of the auxiliary valves is arranged in its respective branch and opens over almost the entire period of the compression stroke and at the beginning of the exhaust stroke of the corresponding cylinder.

8 Claims, 10 Drawing Figures

COMBUSTION PROMOTING DEVICE OF A MULTI-CYLINDER ENGINE

DESCRIPTION OF THE INVENTION

The present invention relates to a combustion promoting device of a multi-cylinder engine.

As a method of increasing the burning velocity of the combustible mixture in the combustion chamber of a cylinder there has been known a method of creating turbulence in the combustion chamber by creating a swirl motion or a squish flow in the combustion chamber. In addition, there has been proposed an engine capable of increasing the burning velocity while ensuring an effective reduction of the amount of $NO_x$ which is caused by the recirculating operation of the exhaust gas, in such a way that the exhaust gas is directly spouted into the combustion chamber so as to create turbulence in the combustion chamber. However, in an engine of this type, since the exhaust gas is spouted into the combustion chamber at the time of the intake stroke, there occurs a problem in that the volumetric efficiency of an engine is reduced. In addition, since the turbulence created in the combustion chamber by the spouting operation of the exhaust gas at the time of the intake stroke is attenuated before the ignition is carried out at the end of the compression stroke, there is a drawback in that the burning velocity cannot be satisfactorily increased.

An object of the present invention is to provide a combustion promoting device for a multi-cylinder engine, which is capable of greatly increasing the burning velocity while ensuring an effective reduction of the amount of $NO_x$, which is caused by the recirculating operation of the exhaust gas, in such a way that an air-fuel mixture containing the fuel which is reformed by the exhaust gas of high temperature is spouted into the combustion chamber at a high speed together with the exhaust gas in the first half of the compression stroke.

According to the present invention, there is provided a multi-cylinder engine having a plurality of cylinders, each having an intake valve and an exhaust valve, said engine comprising: an accumulation chamber; a plurality of mixture feed branches, each interconnecting its respective cylinder with said accumulation chamber; a plurality of auxiliary valves, each of which is located in its respective mixture feed branch, and; means for actuating said auxiliary valves to open at a time of the compression stroke and at a time of the exhaust stroke of the corresponding cylinder.

The present invention may be more fully understood from the description of preferred embodiments of the invention set forth below, together with the accompanying drawings.

DESCRIPTION OF PREFERRED EMBODIMENTS

Figure 1:
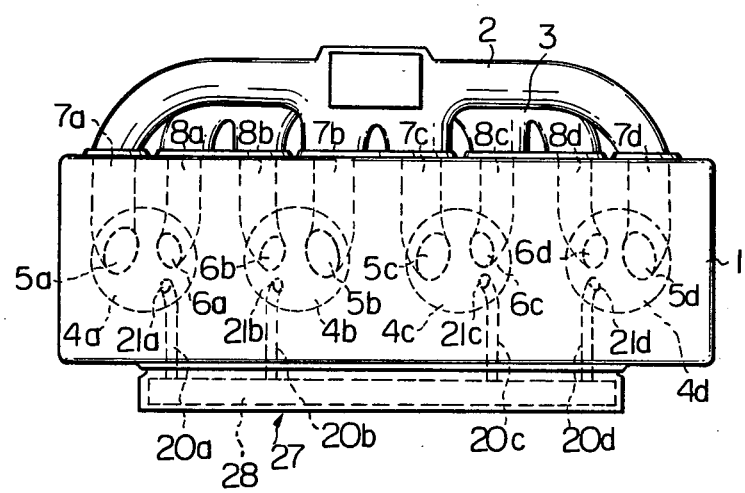
FIG. 1 is a plan view of an embodiment of an engine according to the present invention.
Figure 2:
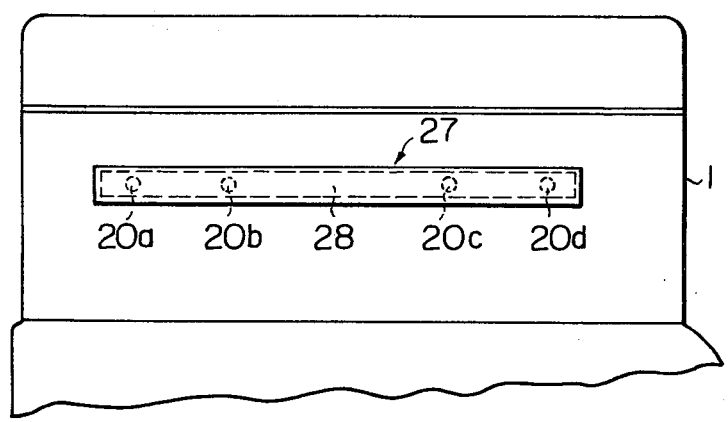
FIG. 2 is a side view of the engine illustrated in FIG. 1.

FIG. 1 is a plan view of a four-cylinder engine according to the present invention. Referring to FIG. 1, 1 designates an engine body, 2 an intake manifold, 3 an exhaust manifold, and 4a, 4b, 4c and 4d designate the No. 1 cylinder, No. 2 cylinder, No. 3 cylinder and No. 4 cylinder, respectively. The cylinders 4a, 4b, 4c and 4d have intake valves 5a, 5b, 5c and 5d and exhaust valves 6a, 6b, 6c and 6d, respectively. The cylinders 4a, 4b, 4c and 4d are connected to the intake manifold 2 via the intake valves 5a, 5b, 5c and 5d and intake ports 7a, 7b, 7c and 7d, respectively, on the one hand, and to the exhaust manifold 3 via the exhaust valves 6a, 6b, 6c and 6d and exhaust parts 8a, 8b, 8c and 8d, respectively, on the other hand.

Figure 3:
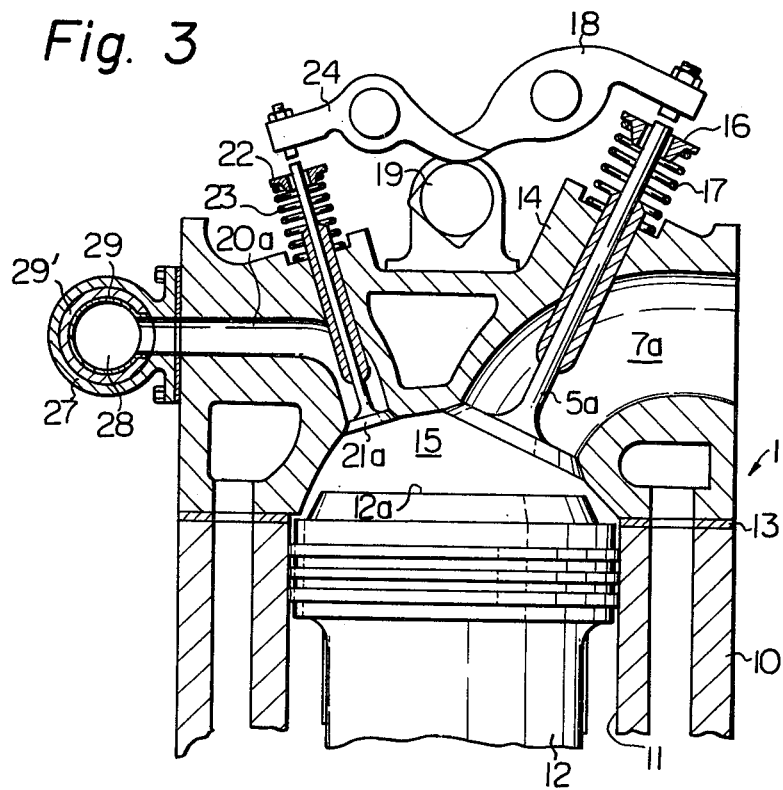
FIG. 3 is a cross-sectional side view of the engine illustrated in FIG. 1.

FIG. 3 is a cross-sectional side view of the No. 1 cylinder 4a illustrated in FIG. 1. The remaining cylinders 4b, 4c and 4d have a construction similar to the cylinder 4a and, accordingly, the depiction of these remaining cylinders is omitted. Referring to FIG. 3, the engine body 1 comprises a cylinder block 10, a piston 12 reciprocally movable in a cylinder bore 11 formed in the cylinder block 10, and a cylinder head 14 fixed onto the cylinder block 10 via a gasket 13. As is illustrated in FIG. 3, a combustion chamber 15 of the No. 1 cylinder 4a is formed between the top face 12a of the piston 12 and the inner wall 14a of the cylinder head 14. A valve retainer 16 is fixed onto the upper end of the valve stem of the intake valve 5a, and a valve 5a, and a valve spring 17 is interposed between the valve retainer 16 and the cylinder head 14. The intake valve 5a is actuated by a rocker arm 18 which is actuated by a cam shaft 19 connected to the crank shaft (not shown) of the engine and rotating at a speed which is half of the rotation speed of the crank shaft.

Figure 4:
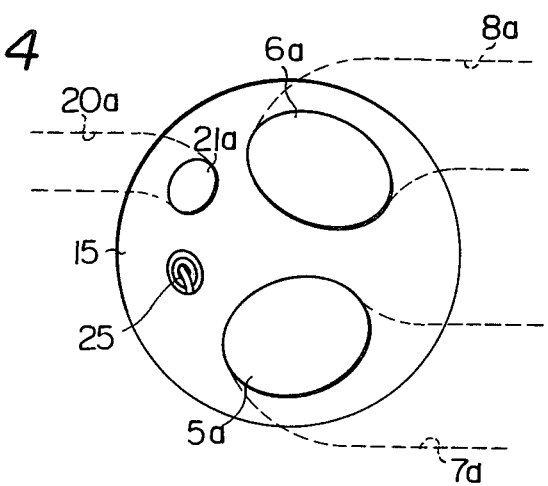
FIG. 4 is a bottom view of the cylinder head illustrated in FIG. 3.

A mixture feed branch 20a is formed in the cylinder head 14, and an auxiliary valve 21a is slidably mounted in the cylinder head 14 for controlling the opening operation of the end of the mixture feed branch 20a which opens into the combustion chamber 15. A valve retainer 22 is fixed onto the upper end of the valve stem of the auxiliary valve 21a, and a valve spring 23 is interposed between the valve retainer 22 and the cylinder head 14. This auxiliary valve 21a is driven by the cam shaft 19 via a rocker arm 24. In addition, as is illustrated in FIG. 4, the electrode 25 of a spark plug is arranged in the combustion chamber 15. As is illustrated in FIG. 1 and 3, a hollow vessel 27 is fixed onto the outer wall of the cylinder head 14 and has therein an accumulation chamber 68 which is formed in an inner core 29 arranged in the hollow vessel 27 via a heat insulator 29'. As is illustrated in FIG. 3, the mixture feed branch 20a is connected to the accumulation chamber 28 and, in addition, as is illustrated in FIG. 1, the mixture feed branches 20b, 20c, 20d of the remaining cylinders 4b, 4c, 4d are also connected to the accumulation chamber 28. In FIG. 1, auxiliary valves of the cylinders 4b, 4c and 4d are designated by reference numerals 21b, 21c and 21d, respectively.

Figure 5:
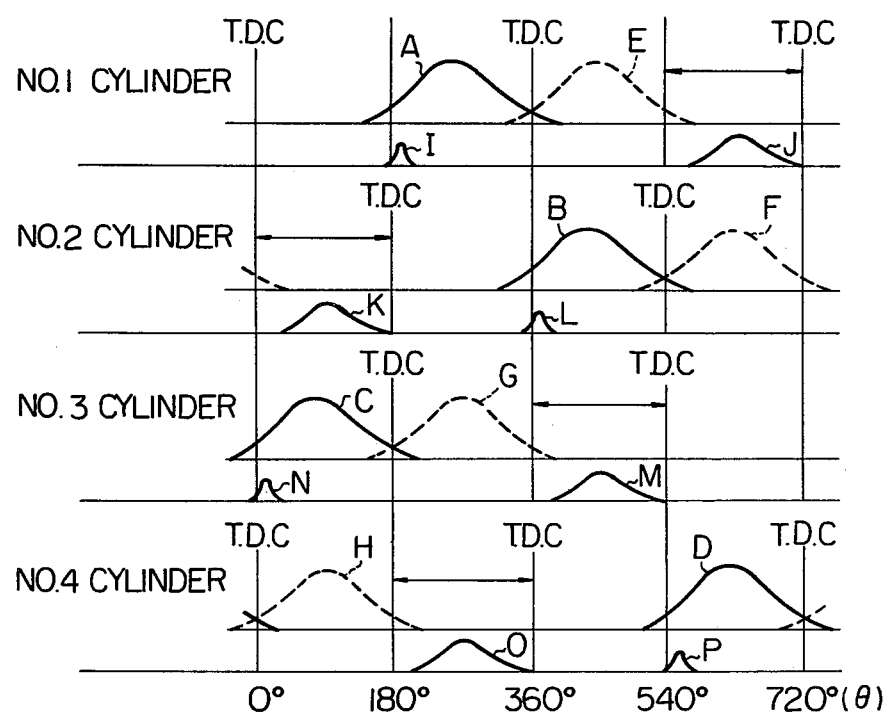
FIG. 5 is a diagram illustrating the opening timing of the intake valve, the exhaust valve and the auxiliary valve.

FIG. 5 illustrates the opening timing of the intake valve, the exhaust valve and the auxiliary valve. In FIG. 5, the ordinate indicates valve lift, and the abscissa indicates crank angle. In addition, in FIG. 5, the curved lines A, B, C and D indicate the opening timing of the exhaust valves of the cylinders 4a, 4b, 4c and 4d, respectively; the curved lines E, F, G and H indicate the opening timing of the intake valves of the cylinders 4a, 4b, 4c and 4d, respectively; the curved lines I and J indicate the opening timing of the auxiliary valve 21a of the No. 1 cylinder 4a; the curved lines K and L indicate the opening timing of the auxiliary valve 21b of the No. 2 cylinder 4b; the curved lines M and N indicate the opening timing of the auxiliary valve 21c of the No. 3 cylinder 4c, and; the curved lines O and P indicate the opening timing of the auxiliary valve 21d of the No. 4 cylinder 4d. FIG. 5 illustrates the case wherein an engine has the firing order of 1-2-4-3. In addition, the compression stroke of each of the cylinders is indicated by the arrow in FIG. 5.

Figure 6:
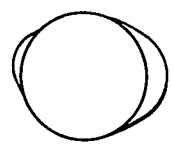
FIG. 6 is a view illustrating a profile of a cam.

As will be understood from FIG. 5, the auxiliary valve of each of the cylinders 4a, 4b, 4c and 4d opens twice per every cycle of an engine. In addition, for example, referring to the No. 1 cylinder illustrated in FIG. 5, it is understood that, as is illustrated by the curved line I, the auxiliary valve opens at the beginning of the exhaust stroke and, then, as is illustrated by the curved line J, the auxiliary valve opens again over almost the entire period of the compression stroke. In this case, as is illustrated by the curved line J, it is preferable that the auxiliary valve open immediately after the intake valve closes and, in addition, the auxiliary valve close at a time close to the time at which the ignition is carried out. The opening timing of the auxiliary valve, which is illustrated by the curved lines I and J, is the same in the remaining cylinders. FIG. 6 illustrates a cam used for actuating the auxiliary valves.

Referring to the No. 1 cylinder illustrated in FIG. 3, the auxiliary valve 21a opens immediately after the intake valve 5a closes, as mentioned above. At this time, a vacuum is produced in the combustion chamber 15 and, as is hereinafter described, an air-fuel mixture and exhaust gas under high pressure are accumulated in the accumulation chamber 28. Consequently, when the auxiliary valve 21a opens, the air-fuel mixture is spouted from the accumulation chamber 28 into the combustion chamber 15, together with the exhaust gas, via the mixture feed branch 20a and the auxiliary valve 21a. As a result of this, a strong turbulence is created in the combustion chamber 15. When the piston 12 moves upwards to a certain extent, the pressure in the combustion chamber 15 becomes equal to that in the accumulation chamber 28. After this, when the piston 12 moves further upwards, the pressure in the combustion chamber 15 becomes higher than that in the accumulation chamber 28 and, as a result, the air-fuel mixture in the combustion chamber 15 is forced into the accumulation chamber 28. Then, the auxiliary valve 21a closes at a time close to the time at which the ignition is carried out, as mentioned previously. At this time, since the pressure in the combustion chamber 15 is quite high, the air-fuel mixture is accumulated in the accumulation chamber 28 under a high pressure. Then, as is illustrated by the curved line N, the auxiliary valve of the No. 3 cylinder opens. At this time, the pressure of the exhaust gas in the No. 3 cylinder is higher than that in the accumulation chamber 28 and, accordingly, the exhaust gas in No. 3 cylinder is forced into the accumulation chamber 28. Since this exhaust gas has a high temperature, the air-fuel mixture forced into the accumulation chamber 28 from the No. 1 chamber, and accumulated in the accumulation chamber 28, is heated by this exhaust gas. As a result of this, the vaporization of the fuel contained in the air-fuel mixture is promoted and, at the same time, the fuel is reformed. Thus, an air-fuel mixture which is reformed so as to easily burn is formed in the accumulation chamber 28. Then, as is illustrated by the curved line K, the auxiliary valve of the No. 2 cylinder opens. At this time, a vacuum is produced in the No. 2 cylinder and, on the other hand, the pressure in the accumulation chamber 28 is maintained at a high level. Consequently, when the auxiliary valve of the No. 2 cylinder opens, the air-fuel mixture, which is reformed so as to easily burn, is spouted from the accumulation chamber 28 into the combustion chamber 15 together with the exhaust gas. As a result of this, a strong turbulence is created in the combustion chamber 15. After this, when the piston 12 moves upwards, the pressure in the combustion chamber 15 becomes higher than that in the accumulation chamber 28 in the latter half of the compression stroke, as metioned previously. Thus, the air-fuel mixture in the combustion chamber 15 is forced into the accumulation chamber 28. After this, the spouting operation of the exhaust gas and the air-fuel mixture, which is reformed so as to easily burn, is repeated in the order of the No.4-No.3-No.1-No.2 cylinders.

As mentioned above, a strong turbulence is created in the combustion chamber 15 in the first half of the compression stroke by the air-fuel mixture and the exhaust gas which are spouted out from the accumulation chamber 28. Consequently, this turbulence continues to be maintained during the combustion process and, thus, the burning velocity is considerably increased. In addition, since the air-fuel mixture spouted from the accumulation chamber 28 into the combustion chamber 15 is reformed so as to easily burn, the ignition is improved and, at the same time, the burning velocity is further increased. Furthermore, the exhaust gas is spouted from the accumulation chamber 28 together with the air-fuel mixture and, as a result, the production of $NO_x$ can be suppressed. As it will be understood from FIG. 5, the air-fuel mixture forced into the accumulation chamber 28 from the No. 1 cylinder flows in the accumulation chamber 28 while mixing with the exhaust gas fed into the accumulation chamber 28 from the No. 3 and the No. 1 cylinders, and then, the air-fuel mixture is spouted into the No. 2 and No. 4 cylinders. This flow of the air-fuel mixture in the accumulation chamber 28 causes a further promotion of the vaporization of fuel and, thus, the air-fuel mixture in the accumulation chamber 28 is reformed so as to burn even more easily.

Figure 7:
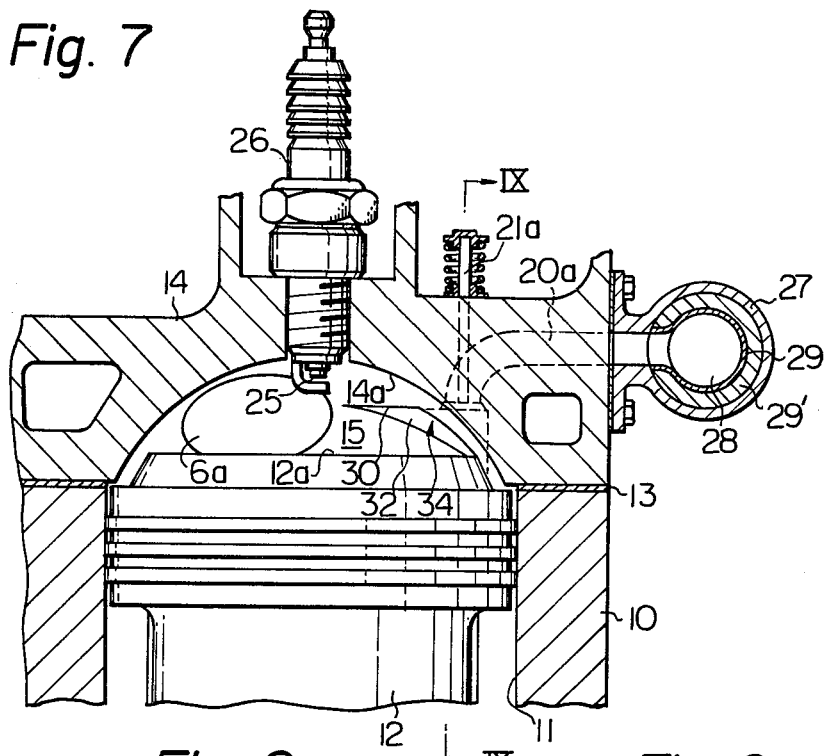
FIG. 7 is a cross-sectional side view of another embodiment according to the present invention.
Figure 8:
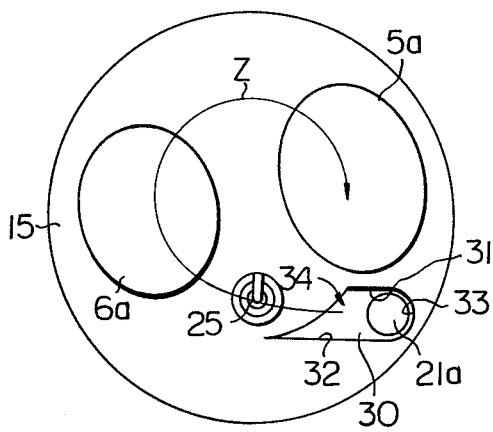
FIG. 8 is a bottom view of the cylinder head illustrated in FIG. 7.
Figure 9:
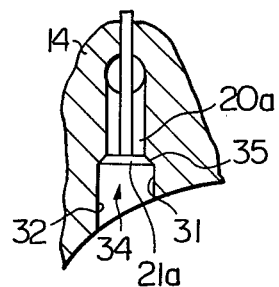
FIG. 9 is a cross-sectional view taken along the line IX—IX in FIG. 7.

FIGS. 7 through 9 illustrate another embodiment according to the present invention. In FIGS. 7 through 9, similar components are indicated with the same reference numerals used in FIG. 3. Referring to FIG. 7, a groove 34, defined by a horizontal wall 30, a pair of vertical walls 31, 32 and a semi-cylindrical wall 33, is formed on the inner wall 14a of the cylinder head 14, and the valve head of the auxiliary valve 21a *l is exposed to the inside of the groove 34. The semi-cylindrical wall 33 is arranged at a position near the periphery of the valve* head of the auxiliary valve 21a, so that, when the auxiliary valve 21a opens, the air-fuel mixture is spouted, together with the exhaust gas, into the combustion chamber 15 from the opening which is formed between the valve seat 35 and the valve head of the auxiliary valve 21a at the left side in FIG. 8. In addition, as illustrated in FIG. 8, the groove 34 is formed so as to extend in the circumferential direction of the combustion chamber 15 and, accordingly, the air-fuel mixture spouted from the mixture feed branch 20a into the combustion chamber 15 via the auxiliary valve 21a causes a strong swirling motion of the combustion chamber 15, as shown by the arrow Z. This swirling motion continues to be maintained during the combustion process. As a result of this, the burning velocity is considerably increased and, thus, a stable combustion can be ensured. In this embodiment, it is preferable that the electrode 25 of the spark plug be located in the extension of the groove 30 at a position near the groove 30 so that the space around the electrode 25 of the spark plug is scavenged by the air-fuel mixture spouted from the accumulation chamber 28 and, at the same time, the air-fuel mixture which is reformed so as to easily burn is led to the space around the electrode 25 of the spark plug.

Figure 10:
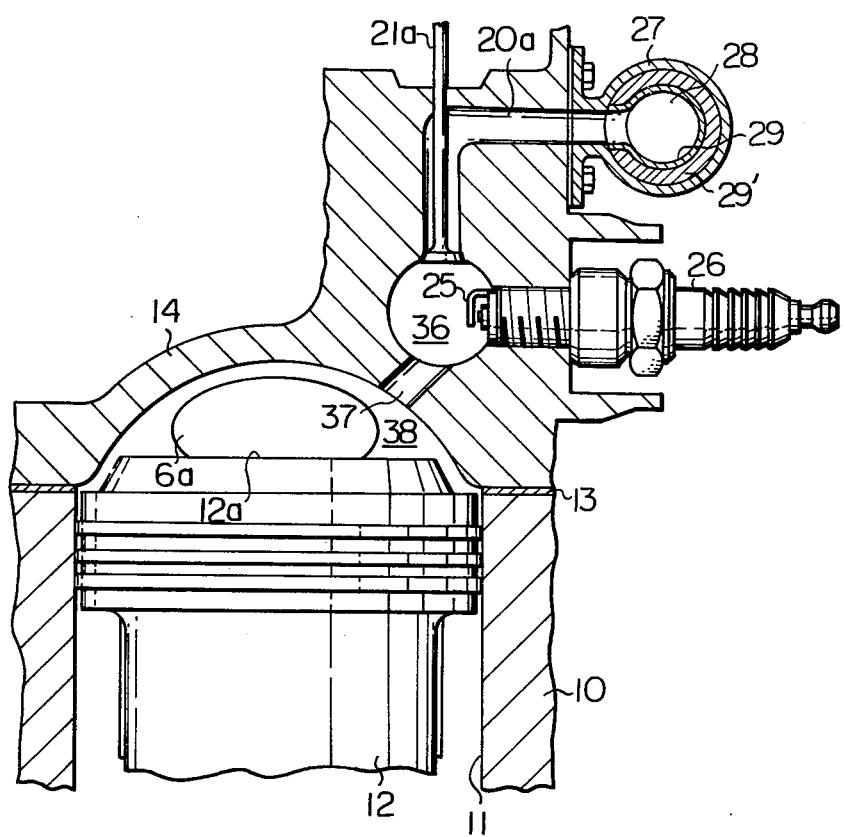
FIG. 10 is a cross-sectional side view of a further embodiment according to the preferred inventioned.

FIG. 10 illustrates a further embodiment according to the present invention. In FIG. 10, similar components are indicated with the same reference numerals as used in FIG. 3. Referring to FIG. 10, an auxiliary combustion chamber 36 is formed in the cylinder head 14 is connected to a main combustion chamber 38 via a connecting passage 37. The auxiliary valve 21a is arranged at the apex of the auxiliary combustion chamber 36, and the auxiliary combustion chamber 36 is connected to the mixture feed branch 20a via the auxiliary valve 21a. In addition, the electrode 25 of the spark plug 26 is arranged within the auxiliary combustion chamber 36. In this embodiment, at the time of the intake stroke, a lean air-fuel mixture or a mixture containing recirculated exhaust gas therein is introduced into the main combustion chamber 28 via the intake valve 5a. Then, the air-fuel mixture and the exhaust gas which are spouted from the mixture feed branch 20a via the auxiliary valve 21a, the auxiliary combustion chamber 36 and the connecting passage 37 causes a strong turbulence in the main combustion chamber 38. At this time, the space around the electrode 25 of the spark plug is scavenged by the air-fuel mixture flowing in the auxiliary combustion chamber 36. Then, in the latter half of the compression stroke, the combustible mixture in the main combustion chamber 38 is forced into the accumulation chamber 28 via the connecting passage 37 and the auxiliary combustion chamber 36. After this, when the combustible mixture in the auxiliary combustion chamber 36 is ignited by the spark plug 26, a burning jet is injected into the main combustion chamber 38 from the connecting passage 37. This burning jet causes a further turbulence in the main combustion chamber 38 and, at the same time, the combustible mixture in the main combustion chamber 38 is ignited by the burning jet. In the embodiment shown in FIG. 10, both the air-fuel mixture spouted from the accumulation chamber 28 and the burning jet injected from the auxiliary combustion chamber 36 causes a strong turbulence in the main combustion chamber 38 and, as a result, the burning velocity is greatly increased.

According to the present invention, since the air-fuel mixture which is reformed so as to easily burn is injected into each of the cylinders in the first half of the compression stroke of the corresponding cylinder and causes a strong turbulence in the corresponding combustion chamber, the burning velocity can be greatly increased and, at the same time, the ignition can be improved. In addition, the amount or $NO_x$ produced in the combustion chamber can be reduced.

While the invention has been described by referring to specific embodiments chosen for purposes of illustration, it should be apparent that numerous modifications could be made thereto by those skilled in the art without departing from the spirit and scope of the invention.

What is claimed is:

1. An internal combustion engine having a plurality of cylinders, each cylinder having an intake valve and an exhaust valve, said engine comprising:
   an accumulation chamber.
   a plurality of mixture feed branches, each branch interconnecting a respective cylinder with said accumulation chamber;
   a plurality of auxiliary valves, each of which is located in a respective mixture feed branch, and;
   means for actuating said auxiliary valves to open at a time of the compression stroke and at a time of the exhaust stroke of the corresponding cylinder, wherein each auxiliary valve opens over almost the entire period of the compression stroke, and the opening duration of each auxiliary valve is longer during the compression stroke than during the exhaust stroke.

2. A multi-cylinder engine as claimed in claim 1, wherein each auxiliary valve opens at the beginning of the exhaust stroke.

3. A multi-cylinder engine as claimed in claim 1, wherein said accumulation chamber comprises a hollow vessel having a wall of heat insulating construction.

4. A multi-cylinder engine as claimed in claim 3, wherein said accumulation chamber comprises an inner hollow core which is supported within said hollow vessel by an intermediate layer of a heat insulating material.

5. A multi-cylinder engine as claimed in claim 1, wherein one end of said mixture feed branch opens in the circumferential direction of the respective combustion chamber of the engine for causing a swirl motion in said combustion chamber by a mixture spouted from said mixture feed branch.

6. A multi-cylinder engine as claimed in claim 5, wherein said engine comprises a plurality of spark plugs, each of which is located in a respective combustion chamber at a position near the one end of its mixture feed branch and at a position wherein the mixture spouted from said mixture feed branch is directly led to said spark plug.

7. A multi-cylinder engine as claimed in claim 1, wherein each cylinder comprises a main combustion chamber and an auxiliary combustion chamber which are interconnected to each other via a connecting passage, said mixture feed branch being connected to said auxiliary combustion chamber.

8. A multi-cylinder engine as claimed in claim 7, wherein each cylinder has a spark plug located in an auxiliary section including said auxiliary combustion chamber and said connection passage.

* * * * *

UNITED STATES PATENT AND TRADEMARK OFFICE
CERTIFICATE OF CORRECTION

PATENT NO. : 4,192,265
DATED : March 11, 1980
INVENTOR(S) : Masuo Amano and Toshio Tanahashi It is certified that error appears in the above—identified patent and that said Letters Patent is hereby corrected as shown below:

Col. 2, line 12, change "preferred inventioned" to --present invention--.

Col. 2, line 64, change "68" to --28--.

Col. 3, line 30, change "Fig. 5" to --Fig. 6--.

Col. 4, line 8, change "chamber" to --cylinder--.

Col. 4, line 28, change "metioned" to --mentioned--.

Col. 4, line 66, after "21a" delete --1--.

Col. 4, lines 66-68 and Col. 5, line 1, lines should not be italicized.

Col. 5, line 12, change "of" to --in--.

Col. 5, line 30, after "14" insert --and--.
Col 6, line 8, change "or" to -- of --.

Signed and Sealed this

Twenty-first Day of July 1981

[SEAL]

Attest:

GERALD J. MOSSINGHOFF

Attesting Officer    Commissioner of Patents and Trademarks